United States Patent [19]

Darling

[11] Patent Number: 5,599,232
[45] Date of Patent: Feb. 4, 1997

[54] MEMORY CARTRIDGE WITH INTERFACE HAVING GRAPHICS CO-PROCESSOR

[75] Inventor: Richard Darling, Moreton Morrell, England

[73] Assignee: Codemasters Limited, London, England

[21] Appl. No.: 318,968

[22] Filed: Oct. 6, 1994

Related U.S. Application Data

[63] Continuation of Ser. No. 42,567, Apr. 5, 1993, Pat. No. 5,395,112.

[30] Foreign Application Priority Data

May 2, 1992 [GB] United Kingdom ................... 9210786

[51] Int. Cl.$^6$ ..................................................... A63F 9/22
[52] U.S. Cl. .............................. 463/44; 463/43; 463/45; 364/410
[58] Field of Search ....................... 273/148 B, 433–437; 463/43–47; 364/410

[56] References Cited

U.S. PATENT DOCUMENTS

| | | | |
|---|---|---|---|
| 3,829,741 | 8/1974 | Athey ........................................ | 317/101 |
| 3,932,016 | 1/1976 | Ammenheuser ........................... | 339/65 |
| 4,017,770 | 4/1977 | Valfare ...................................... | 361/399 |
| 4,080,031 | 3/1978 | Sawford-Atkins ........................ | 339/65 |
| 4,397,511 | 8/1983 | Clark et al. ........................... | 339/17 CF |
| 4,480,835 | 7/1984 | Williams .............................. | 273/148 B |
| 4,588,187 | 5/1986 | Dell ........................................ | 273/1 E |
| 4,596,390 | 6/1986 | Studley ................................ | 273/148 B |
| 4,844,465 | 7/1989 | Hibino et al. ....................... | 273/148 B |
| 4,865,321 | 9/1989 | Nakagawa et al. .................... | 273/85 G |
| 4,887,188 | 12/1989 | Yoshida et al. .......................... | 361/413 |

(List continued on next page.)

FOREIGN PATENT DOCUMENTS

| | | |
|---|---|---|
| 0217668 | 4/1987 | European Pat. Off. . |
| 0268419 | 5/1988 | European Pat. Off. . |
| 0402067 | 12/1990 | European Pat. Off. . |
| 0431723 | 6/1991 | European Pat. Off. . |
| 0466935 | 1/1992 | European Pat. Off. . |
| 0636966 | 2/1995 | European Pat. Off. . |
| 0234286 | 11/1985 | Japan ........................................ 365/52 |
| 2115989 | 9/1983 | United Kingdom .................... 273/435 |

OTHER PUBLICATIONS

Dr. Dobb's Journal, Software Tools For The Professional Programmer, #176 May 1991.
Dr. Dobb's Journal, Software Tools For The Professional Programmer, #153 Jul. 1989.
Starwing Manual.
Starwing (Front of Game and Back of Game).

*Primary Examiner*—Jessica J. Harrison
*Assistant Examiner*—Mark Sager
*Attorney, Agent, or Firm*—Fitzpatrick, Cella, Harper & Scinto

[57] ABSTRACT

A memory cartridge for use in a video game console includes an interface and a compact game catridge removably attachable to the interface. The compact game cartridge has a Read Only Memory in it storing at least one game program to be executed by the game console. The compact game cartridge may so include other components dedicated to the at least one game program necessary for the game console to execute the game program. The interface has electrical circuitry therein such as for example, a bank switching controller, graphics memory, a security circuit to satisfy a security system in the gaming console etc, which is not dedicated to any specific game program but which nonetheless, is necessary for the game console to execute a game program stored in a compact game cartridge. In this manner, all non-dedicated circuitry needed for a game program to be executed in the game console is included in the interface, allowing inexpensive compact game cartridges having only game program specific components therein, to be manufactured. A range of compact game cartridges therefore, be attached to a single interface and loaded into the game console allowing the game programs stored in the compact game cartridges to be executed.

23 Claims, 8 Drawing Sheets

U.S. PATENT DOCUMENTS

| | | | |
|---|---|---|---|
| 4,919,626 | 4/1990 | Anhalt et al. | 439/260 |
| 4,980,856 | 12/1990 | Ueno | 364/900 |
| 5,004,232 | 1/1989 | Nakagawa | 364/148 B |
| 5,016,876 | 5/1991 | Loffredo | 273/437 |
| 5,112,051 | 5/1992 | Darling et al. | 273/148 B |
| 5,155,663 | 10/1992 | Harase | 361/395 |
| 5,203,848 | 4/1993 | Wang | 273/435 |
| 5,238,250 | 8/1993 | Leung et al. | 273/148 |
| 5,282,621 | 2/1994 | Tseng | 273/148 B |
| 5,357,604 | 10/1994 | San et al. | 395/162 |
| 5,388,841 | 2/1995 | San et al. | 273/435 |

MEMORY CARTRIDGE WITH INTERFACE HAVING GRAPHICS CO-PROCESSOR

This application is a continuation division of application Ser. No. 08/042,567 filed Apr. 5, 1993 now U.S. Pat. No. 5,395,112.

FIELD OF THE INVENTION

The present invention relates to cartridges and in particular to memo cartridges for use in video game systems.

BACKGROUND OF THE INVENTION

Video game systems are well known in the art and can be found in most households throughout North America. The most common of these household video game systems is that manufactured by Nintendo® under the name Nintendo Entertainment System®. This type of video game system is disclosed in U.S. Pat. No. 4,799,635 to Nakagawa and includes a game console to be connected to a television in the household which receives removable memory cartridges storing game programs to be executed by the game console.

The game console referred to above includes a game microprocessor, a graphics processor or PPU and a security system. The security system is designed to prevent the game microprocessor from executing game programs stored in unauthorized memory cartridges. In addition to program Read Only Memory ("ROM") which holds the game program, the game cartridges include a specialized chip to communicate with the security system in the game console, graphics memory communicating with the graphics processor in the game console and may include bank switching circuitry acting between the program ROM and the game microprocessor in the game console.

Because of the number of components in each memory cartridge necessary to permit the game program stored therein to be executed by the game microprocessor, the manufacturing costs of memory cartridges is significant making the memory cartridges expensive to the consumer almost to the point where the cost is prohibitive. Expense to consumers has been recognized as a concern especially in the case where changes to game consoles have been made to upgrade them, which make memory cartridges designed for earlier versions of the game consoles unusable in newer game consoles.

To satisfy consumers, interfaces to allow memory cartridge designed for one type of game console to be used in a second type of game console have been considered. An example of this type of interface is shown in U.S. Pat. No. 4,844,465 to Hibino et al. The interface has one end to receive a memory cartridge designed to operate in the first type game console and a second end to be received in the receiving port of the second type game console. Internal circuitry within the interface makes the memory cartridge electrically compatible with the second type game console while the external configuration of the interface makes the memory cartridge physically compatible with the second type game console. Although this interface allows memory cartridges made for use in game consoles which have for all purposes become obsolete, to be used with newer game consoles, the costs associated with the individual memory cartridges is still a problem and heretofore has not been addressed.

It is therefore an object of the present invention to provide a novel memory cartridge for use in a video game system.

SUMMARY OF THE INVENTION

According to one aspect of the present invention there is provided a memory cartridge for use in a video game console comprising:

an interface having a first casing with one end to be received by said video game console; and a game cartridge including a second casing removably attachable to said first casing and including at least one game program stored therein to be executed by said game console, said interface including electrical circuitry therein not dedicated to any specific game program but necessary for said video game console to execute said at least one game program in said game cartridge.

Preferably, the electrical circuitry includes a bank switching controller in electrical communication with the game cartridge and the video game console when the interface and game cartridge are attached and the memory cartridge is received by the video game console. It is also preferred that the electrical circuitry further includes a security circuit to communicate with a security system in the game console.

Preferably, the electrical circuitry also includes at least one component which is not necessary to execute the at least one game program but which is desirable to give the memory cartridge extra facilities. In particular, it is preferred that in one embodiment the electrical circuitry further includes power supply means and a game state memory, the game state memory storing data representing the state of a game program being executed by the game console when the memory cartridge is removed from the game console. In another embodiment, it is preferred that the power supply means and game state memory are replaced by non-volatile RAM or E$^2$PROM. In yet another embodiment, it is preferred that electrical circuitry further includes a graphics memory storing graphics data to be executed by the game console and a graphics co-processor electrically connected to the graphics memory to enhance the graphics capability of the game console.

Preferably, the game cartridge includes a Read Only Memory storing the at least one game program and other electrical components specific to the at least one game program necessary for the game console to execute the at least one game cartridge. It is also preferred that the interface and the game cartridge include complimentary connectors releaseably engageable with each other to establish electrical interconnections between electrical components therein. Preferably, the game cartridge push-fits into the interface to inhibit accidental separation therebetween.

According to another aspect of the present invention there is provided an interface comprising:

a casing having a first end to be received in the receiving port of a video game console, and a second end to receive a game cartridge storing at least one game program to be executed by said game console; and electrical circuitry within said casing establishing an electrical connection between said game console and said game cartridge when said second end receives a game cartridge and said first end is received by said game console, said electrical circuitry including at least one component not dedicated to any specific game program to be executed by said game console but necessary for said game console to execute said at least one game program.

The present invention provides advantages in that inexpensive compact game cartridges can be manufactured due to the fact that they only include components dedicated to the specific game programs stored therein, that are needed for the game console to execute the game program. All other components necessary for a game program to be executed by the game console or desired to provide the memory cartridge with extra facilities form part of the interface. Therefore, a consumer need only buy one interface which can be used with a variety of compact game cartridges.

BRIEF DESCRIPTION OF THE DRAWINGS

Embodiments of the present invention will now be described more fully with reference to the accompanying drawings in which.

DESCRIPTION OF THE PREFERRED EMBODIMENTS

Figure 1:
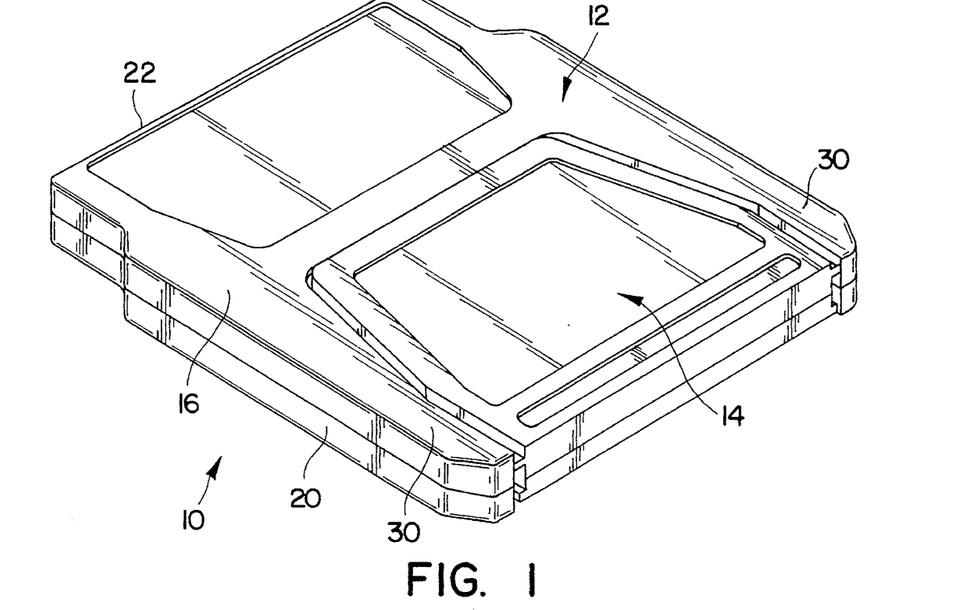
FIG. 1 is a perspective view of a memory cartridge taken from above and from the side.
Figure 2:
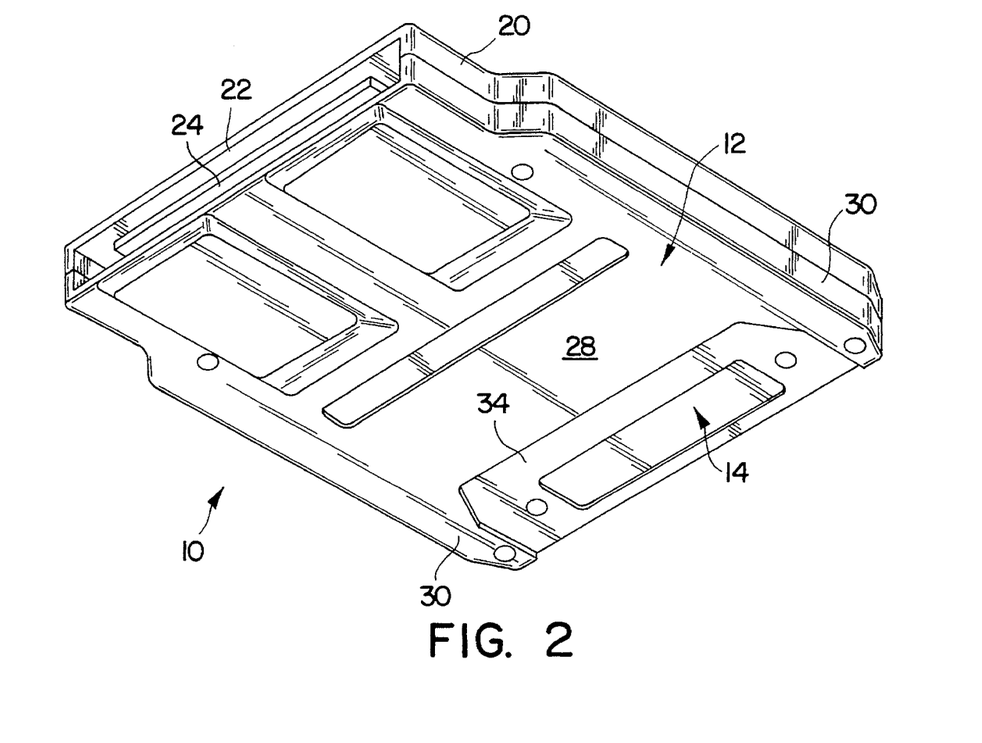
FIG. 2 is a perspective view of the memory cartridge illustrated in FIG. 1 taken from below and from the side.

Referring now to FIGS. 1 and 2, a memory cartridge for use in a video game console of the type disclosed in U.S. Pat. No. 4,799,635 to Nakagawa is shown and is generally indicated by reference numeral 10. The memory cartridge 10 includes two main parts, namely an interface 12 and a compact game cartridge 14. The interface 12 and the compact game cartridge 14 can be assembled in an attachable/detachable manner as will be described.

Figure 7:
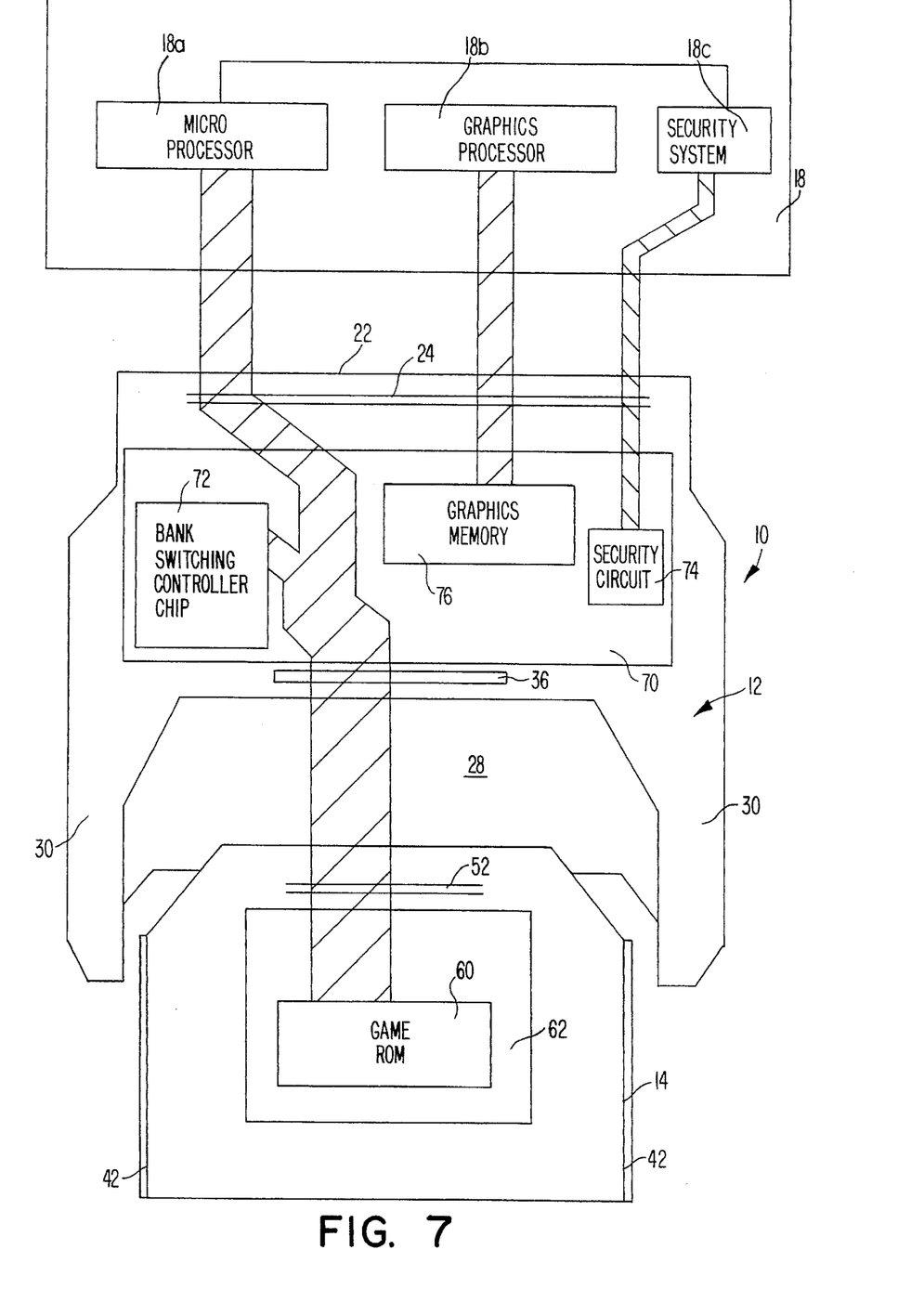
FIG. 7 is a schematic of the memory cartridge illustrated in FIG. 3.

The interface 12 includes a shallow casing 16 shaped and dimensioned to co-operate with the cartridge receiving port of a computer game console 18 (see FIG. 7). In particular, the sides 20 of the casing 16 are inwardly tapered near its front to define a narrow front end 22. The front end 22 is open to expose an edge connector 24 which is received by a complimentary connector in the game console 18 when the interface 12 is loaded into the game console.

Figure 3:
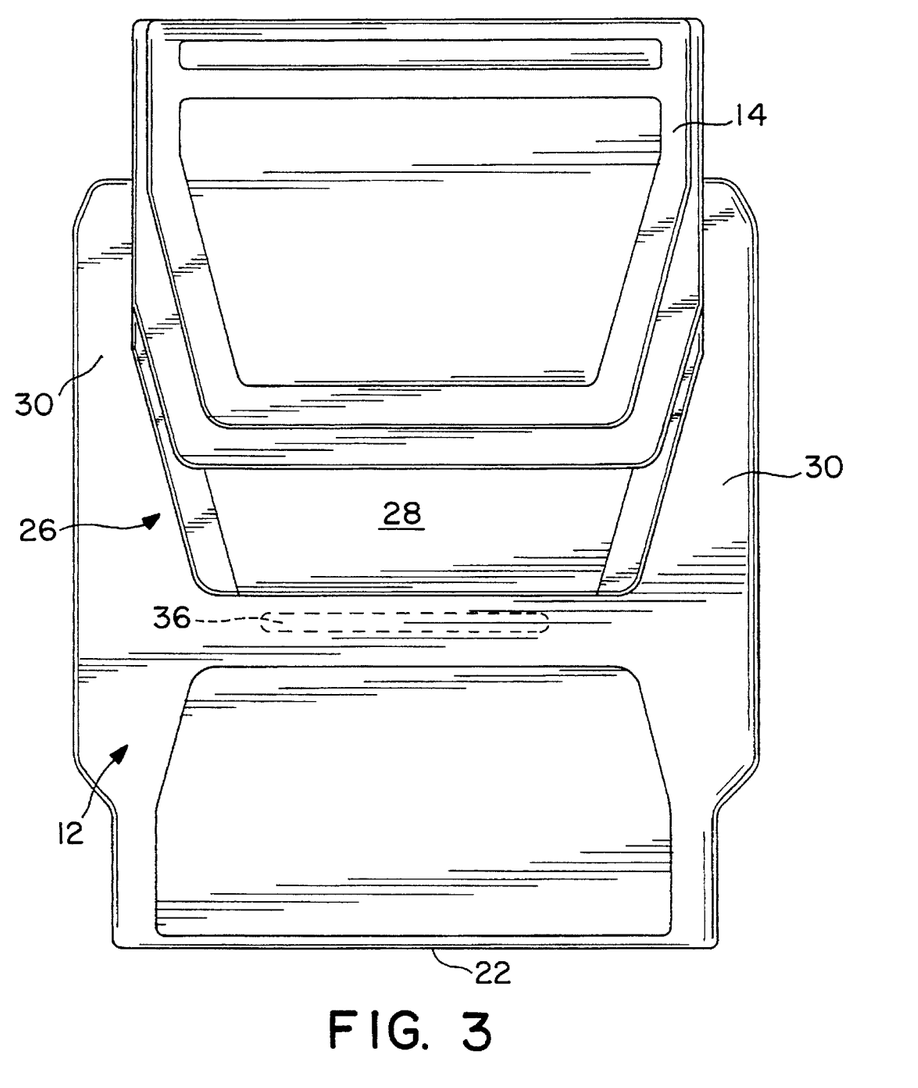
FIG. 3 is a top plan view of the memory cartridge with the components thereof partly separated.
Figure 4:
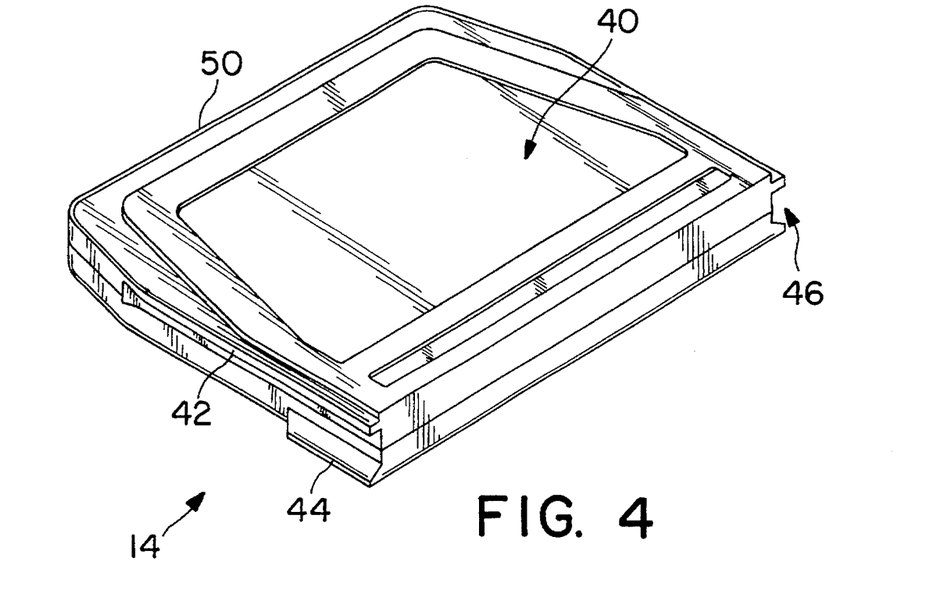
FIG. 4 is a perspective view of a compact game cartridge forming part of the memory cartridge illustrated in FIG. 1, taken from above and from the side.
Figure 5:
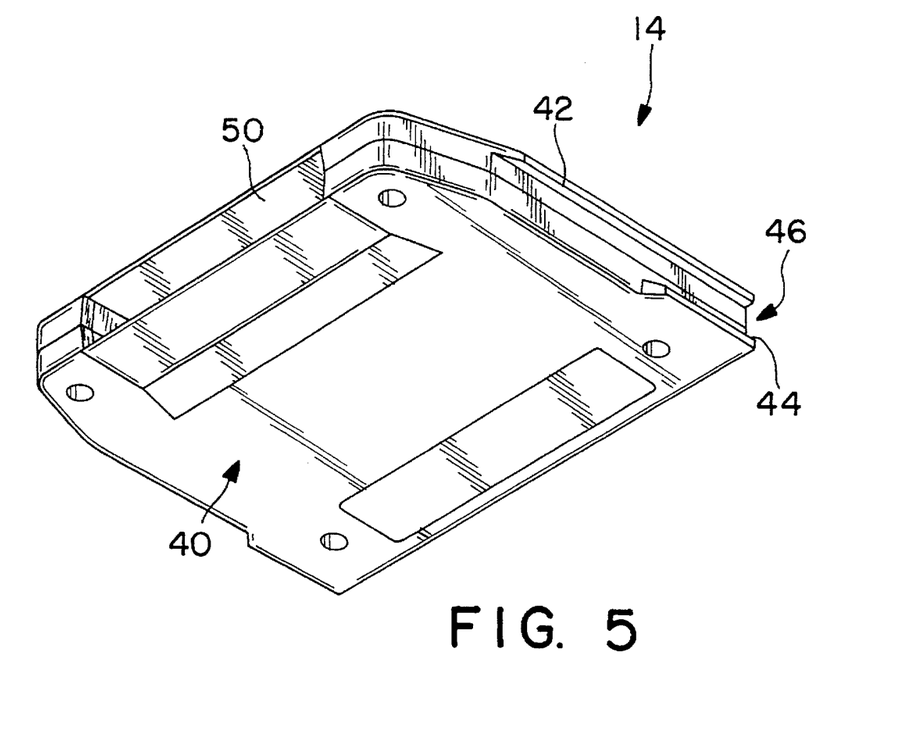
FIG. 5 is a perspective view of the compact game cartridge shown in FIG. 4 taken from below and from the side.
Figure 6A:
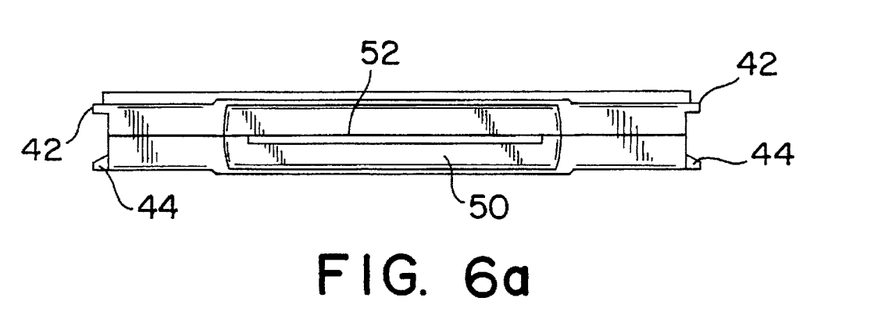
FIG. 6a is a front elevation view of the compact game cartridge illustrated in FIG. 4.
Figure 6B:
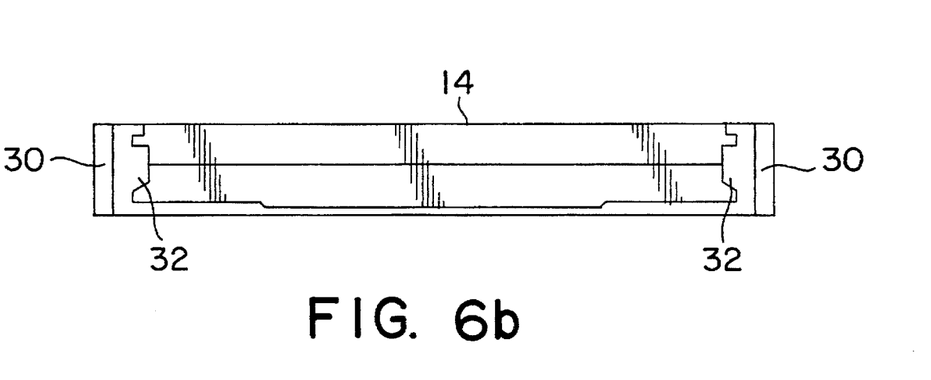
FIG. 6b is a rear elevation view of the memory cartridge illustrated in FIG. 1.

The rear of the casing 16 is configured to define a tray 26 best seen in FIG. 3. The tray includes a base 28 and a pair of arms 30 which run along the sides of the base. Each arm 30 has an inwardly extending, trapezoidal projection 32 near its distal end (see FIG. 6b). A notch 34 is cut out of the rear of the base 28 to expose a portion of the compact game cartridge 14 when the interface 12 and the compact game cartridge 14 are attached, as will be described herein. The casing 16 is open at the front of the tray 26 to expose a double sided edge connector 36. The double sided edge connector 36 receives a complimentary connector on the compact game cartridge 14.

The compact game cartridge 14 is best illustrated in FIGS. 4 to 6a and includes a casing 40 shaped and dimension to be push-fit in the tray 26 to inhibit accidental separation of the compact game cartridge 14 and the interface 12 when they are attached. Upper and lower rails 42 and 44 respectively are provided on the sides of the casing 40 and extend partly along the length of the compact game cartridge 14. The spaces 46 between the rails 42 and 44 receive the projections 32 with the rails being shaped complimentarily to the shape of the projections. The front end 50 of the compact game cartridge 14 is open to expose an edge connector 52 which is received by the double sided edge connector 36 in the interface 12 when the compact game cartridge 14 and the interface 12 are attached.

Referring now to FIG. 7, the internal circuitry in the interface 12, the compact game cartridge 14 and the game console 18 is better illustrated. As can be seen, the game console 18 includes a game microprocessor 18a, a graphics processor 18b and a security system 18c. Details of the game console 18 and its operation can be found in U.S. Pat. No. 4,799,635 and therefore, further details of the game console 18 will not be discussed herein.

The compact game cartridge 14 includes a game Read Only Memory ("ROM") 60 storing at least one game program to be executed by the game console 18. The game ROM 60 is mounted on a printed circuit board 62 electrically connected to the edge connector 52 so that an electrical connection between the game ROM 60 and the interface 12 is established when the interface 12 and the compact game cartridge 14 are attached. Other electrical components specific to the at least one game program stored in the game ROM 60 necessary for the game console 18 to execute the game program, may also be mounted on the printed circuit board 62 and electrically connected to the edge connector 52 and the game ROM 60, if necessary.

The interface 12, in this example, includes a printed circuit board 70 on which are mounted a bank switching controller 72, a security circuit 74 to communicate with the security system 18c in the game console 18 and graphics memory 76 for storing graphic data. The bank switching controller 72 is electrically connected to the double sided edge connector 36 to allow signals from the controller 72 to be applied to the game ROM 60. The controller 72, graphics ROM 76 and security circuit 74 are also electrically connected to the edge connector 24 so that they may communicate with the components 18a, 18b and 18c in the game console 18.

In use, when it is desired to play a game program stored in the game ROM 60 of a compact game cartridge 14, the compact game cartridge 14 is aligned with the tray 26 so that the front of the compact game cartridge 14 rests on the base 28. The compact game cartridge is then pushed into the tray 26 along the base 28 so that the rails 42, 44 pass over and under the projections 32 (see FIG. 3). The complimentary configuration of the projections 32 and the rails 42, 44 ensure that the compact game cartridge 14 is properly guided as it slides so that that the edge connector 52 on the compact game cartridge 14 and the double sided edge connector 36 on the interface 12 remain aligned. The compact game cartridge 14 is pushed until the interface 12 and the compact game cartridge 14 snap together with the edge connector 52 being received in the double sided edge connector 36 establishing an electrical connection between the interface 12 and the compact game cartridge 14, and completing a memory cartridge 10.

With the compact game cartridge 14 push-fit into the tray 26, accidental separation of the compact game cartridge 14 and the interface 12 is unlikely. The memory cartridge 10 can then be loaded into the receiving port of the game console 18 so that the game program in the game ROM 60 can be executed and played. If it is desired to play a different game program, the memory cartridge 10 must be removed from the game console 18. The compact game cartridge 14 can then be pulled from the interface 12 by grasping the exposed end of the compact game cartridge 14. A new compact game cartridge 14 having the desired game program to be played stored in it, can be pushed into the tray 26 in the manner described above, and the new memory cartridge 10 can be loaded into the game console 18.

It will be appreciated to those of skill in the art that the components in the interface 12 are not dedicated to any specific game program but nonetheless are either required in order to allow game programs designed for the game console 18 to be executed and played or desired to give the memory cartridge 10 extra facilities. It will also be appreciated that a range of compact game cartridges 14 each containing a game ROM 60 storing at least one game program can be attached to the same interface 12 to create different memory cartridges 10 for use with the game console 18. This often significant advantages as compared with prior art memory cartridges wherein all of the electrical circuitry necessary to play a game program is contained within a single casing. More specifically, the compact game cartridges need only include components dedicated to the specific game programs stored in the game ROM therein, with all other non-dedicated circuitry needed to execute and play a game program on the game console 18 being contained in the interface 12. In this way, the manufacturing costs of the compact game cartridges 14 can be reduced significantly in that each compact game cartridge has relatively few components and therefore, involves a simpler assembly procedure.

Figure 8A:
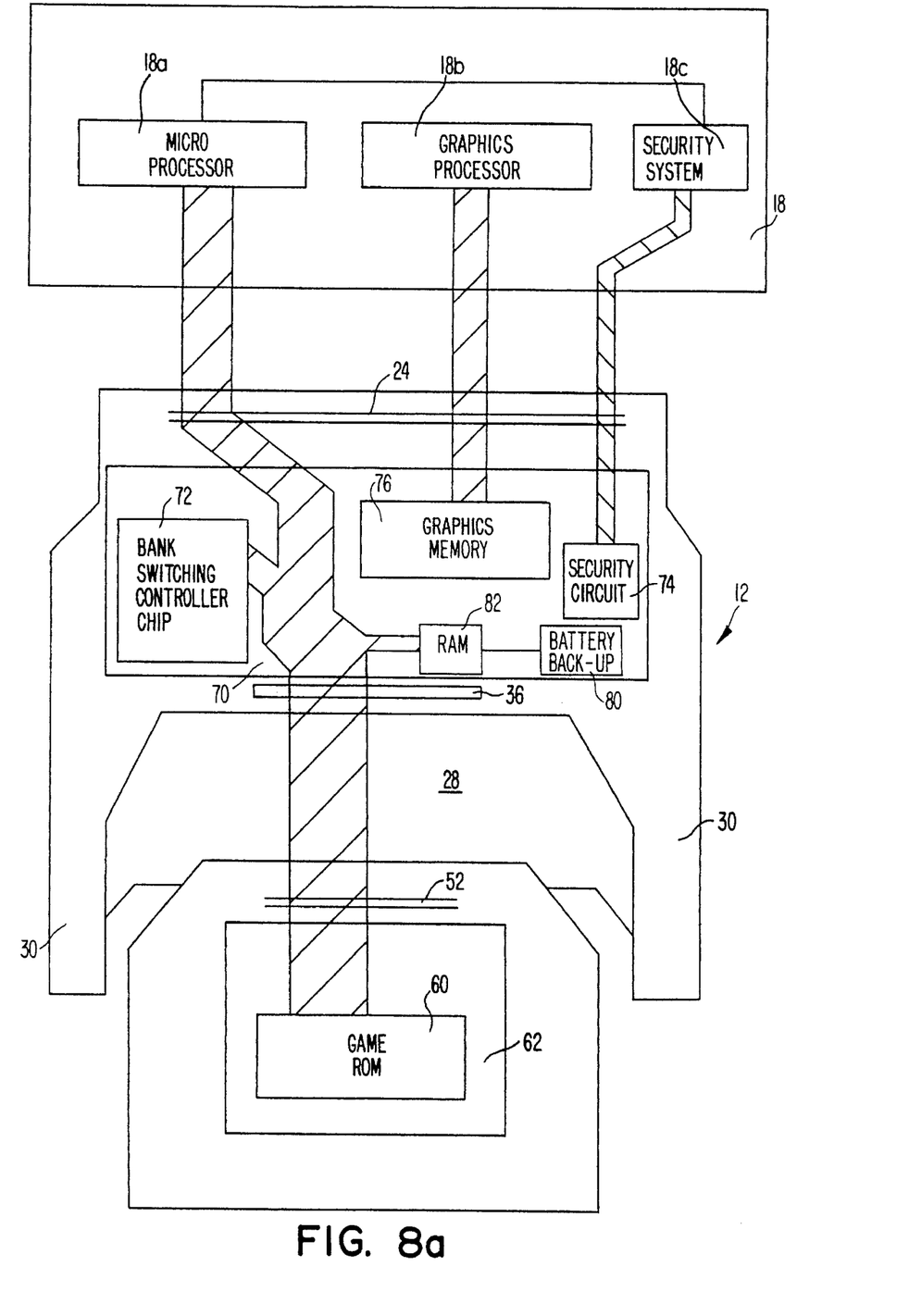
FIG. 8a is a schematic of another embodiment of a memory cartridge.

Referring now to FIG. 8a, an alternative embodiment of the interface 12 is shown. In this embodiment, the interface 12 further includes a battery back-up circuit 80 and a back-up RAM 82. The back-up circuit 80 functions to maintain the state of the memory cartridge 10 should it be removed from the game console 18 while the back-up RAM 80 functions to store the state of the game program which was being executed by the game console prior to the removal of the memory cartridge 10 from the game console 18. The interface 12 may also be arranged to maintain the state of several different game programs and in this case, data identifying a particular game program would be stored in specified registers of the RAM 82 for future use in association with data representing the state of that game program. If all of the available specified registers in the RAM 82 are occupied, the oldest data stored in the specified registers would be overwritten. If desired, a log could be maintained in order to determine the relative "ages" of the various entries.

Figure 8B:
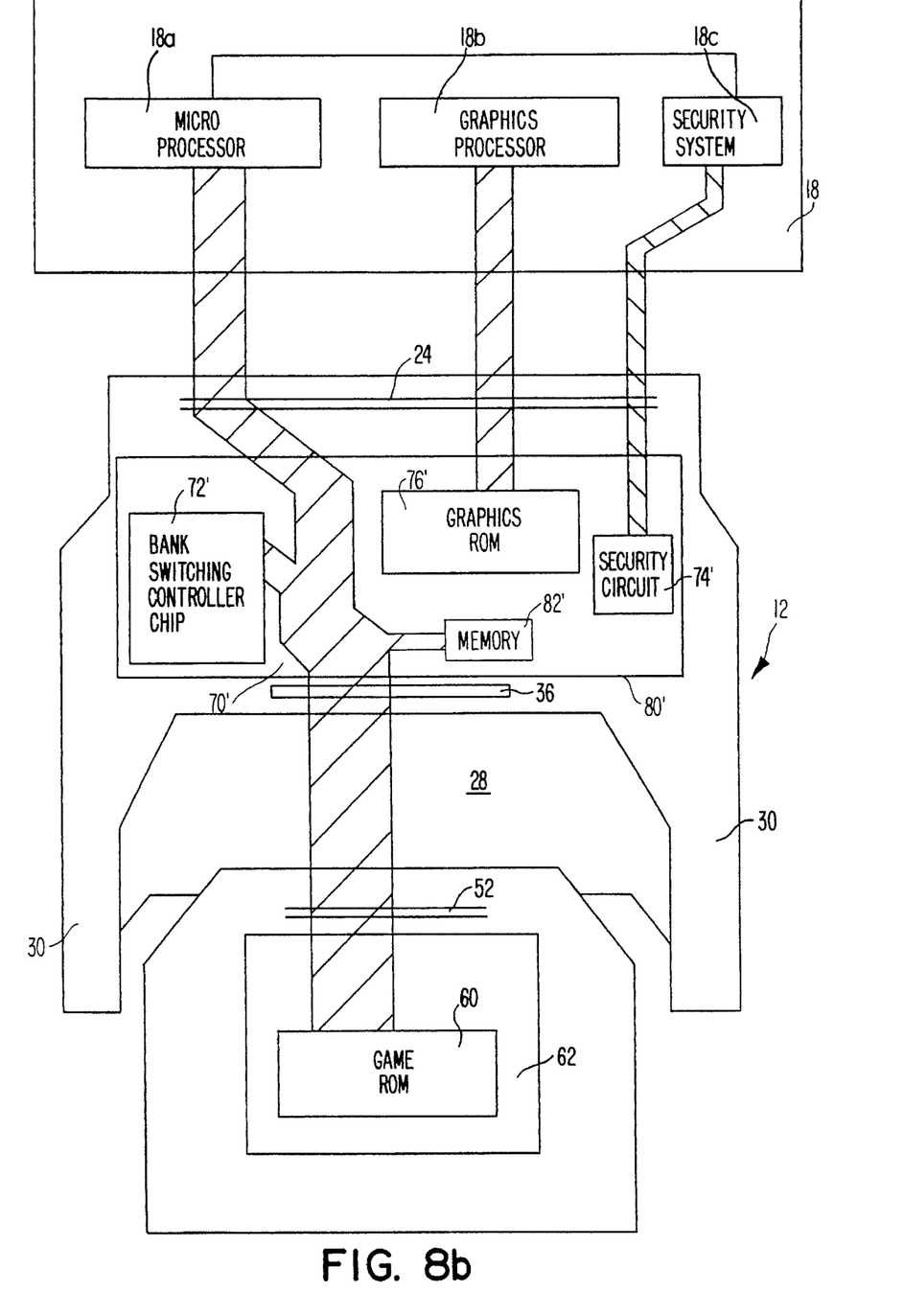
FIG. 8b is a schematic of yet another embodiment of a memory cartridge.

FIG. 8b shows yet another embodiment of the interface 12 similar to that shown in FIG. 8b. In this embodiment, a memory 82' in the form of non-volatile RAM or E²PROM (electrically erasable programmable read only memory) is provided as a substitute for the battery back-up circuit 80 and the back-up RAM 82. The memory 82' forms the same function as the back-up circuit 80 and RAM 82 namely, to maintain the state of the memory cartridge 10 should it be removed from the game console 18 and to store the state of the game program which was being executed by the game console prior to the removal of the memory cartridge 10 from the game console 18.

Figure 9:
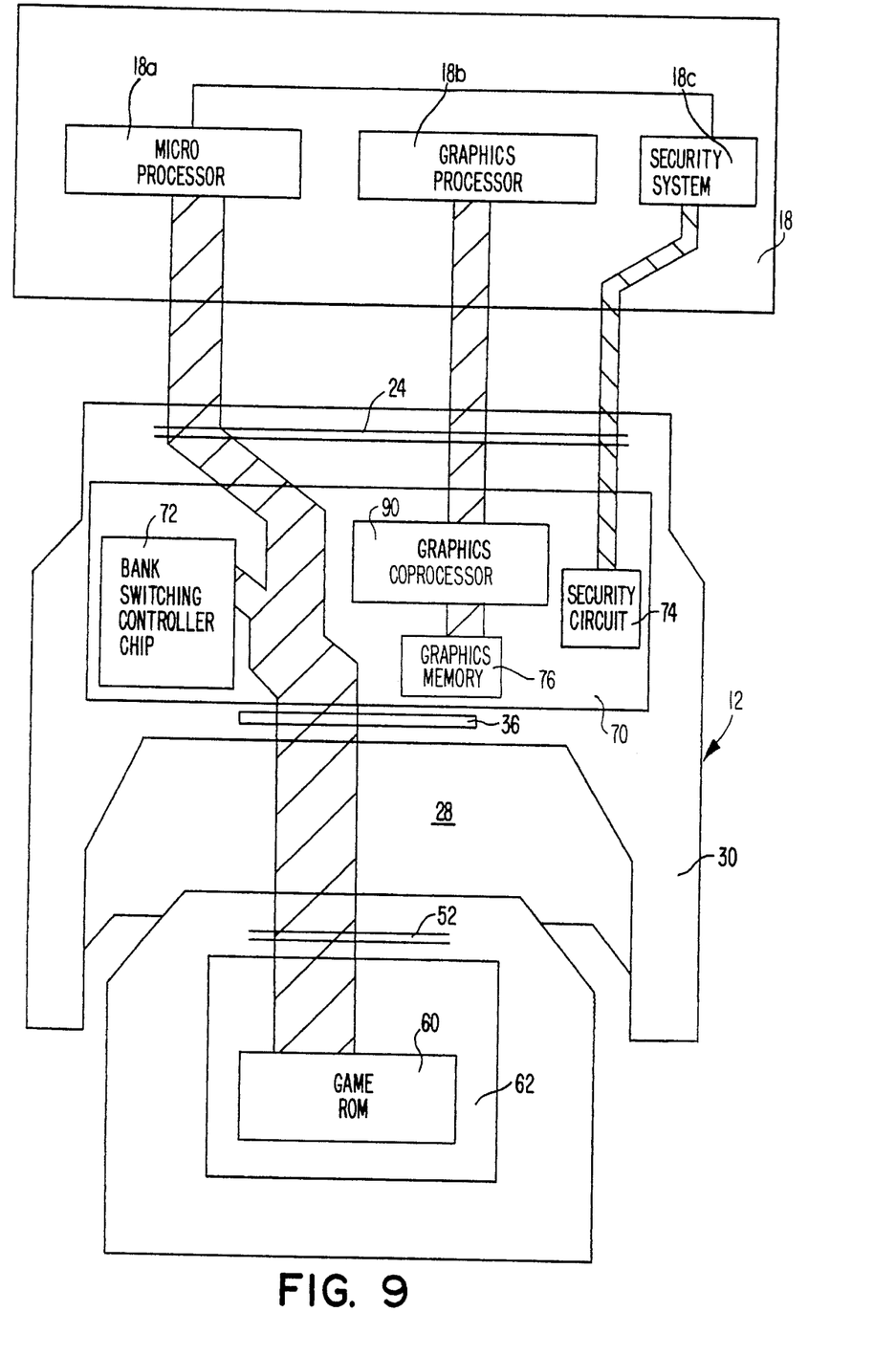
FIG. 9 is a schematic of still yet another embodiment of a memory cartridge.

FIG. 9 shows still yet another embodiment of the interface 12. In this embodiment, the interface 12 further includes a graphics co-processor 90 electrically connected to the graphics memory 76 and the edge connector 24. The graphics co-processor 90 enhances the graphics capability of the game console 18 to make games played on the game console visually more appealing to the individual playing the games.

It should be realized that although the present memory cartridge 10 has been described as being for use in a game console of the type disclosed in U.S. Pat. No. 4,799,635, memory cartridges in accordance with the present invention may be used in any game console which requires the memory cartridge to include electrical components which are both dedicated and nondedicated to the specific game programs stored therein.

The present invention provides advantages over the prior art in that only one interface need be purchased by a consumer to permit a range of compact game cartridges to be played in the game console. Since the compact game cartridges include only components dedicated to the specific game program or programs stored therein, the cost of each compact game cartridge is significantly reduced as compared with prior art memory cartridges which include a single casing housing both dedicated and non-dedicated components.

We claim:

1. A memory cartridge removably received by a predetermined type video game console which has a microprocessor and a graphics processor, said cartridge comprising:

an interface including a graphics co-processor and a first casing with one end received by said predetermined type video game console; and a game cartridge including a second casing removably attachable to said first casing and including at least one game program therein requiring the combination of said graphics co-processor and said predetermined type video game console graphics processor for execution.

2. A memory cartridge as defined in claim 1 wherein said interface further includes a bank switching controller in electrical communication with said game cartridge and said predetermined video game console when said interface and game cartridge are attached and said memory cartridge is received by said predetermined type video game console.

3. A memory cartridge as defined in claim 1 wherein said interface further includes a security circuit to communicate with a security system in said predetermined type video game console.

4. A memory cartridge as defined in claim 1 wherein said interface further includes at least one component which is not necessary to execute the at least one game program but which is desirable to give the memory cartridge extra facilities.

5. A memory cartridge as defined in claim 4 wherein said at least one component comprises power supply means and a game state memory, said game state memory storing data representing a state of a game program being executed by said predetermined type video game console when said memory cartridge is removed from said predetermined type video game console.

6. A memory cartridge as defined in claim 4 wherein said at least one component comprises a memory including at least one of a non-volatile RAM or E²PROM to store the state of a game program being executed by said predetermined type video game console when said memory cartridge is removed from said predetermined type video game console.

7. A memory cartridge as defined in claim 2 wherein said game cartridge includes a Read Only Memory storing said at least one game program and at least one other electrical component specific to said at least one game program and necessary for said predetermined type video game console to execute said at least one game program.

8. A memory cartridge as defined in claim 1 wherein said interface and said game cartridge include complementary connectors releasably engageable with each other to establish electrical interconnections between electrical components therein.

9. A memory cartridge as defined in claim 8 wherein said game cartridge push-fits into said interface to inhibit accidental separation therebetween.

10. A memory cartridge removably received by a video game console having a graphics processor, comprising:

an interface including a first casing adaptably receivable by said video game console; and a game cartridge including a second casing removably attachable to said first casing and including at least one game program stored therein played by said video game console, said interface including at least one graphics co-processor used by said video game console and said at least one game program requiring said at least one graphics co-processor in combination with said video game console graphics processor for execution of said at least one game program.

11. A memory cartridge as defined in claim 10 wherein said interface further includes a graphics memory storing graphics data, said at least one graphics co-processor being electrically connected to said graphics memory.

12. A memory cartridge as defined in claim 10 wherein said interface further includes a bank switching controller in electrical communication with said game cartridge and said video game console when said interface and game cartridge are attached and said memory cartridge is received by said video game console.

13. A memory cartridge as defined in claim 12 wherein said interface further includes a security means to communicate with a security system in said video game console.

14. A memory cartridge as defined in claim 13 wherein said interface further includes power supply means and a game state memory, said game state memory storing data representing a state of a game program being played by said video game console when said memory cartridge is removed from said video game console.

15. A memory cartridge as defined in claim 14 wherein said interface further includes memory including at least one of a non-volatile RAM or E²PROM to store the state of the game program being played by said video game console when said memory cartridge is removed from said video game console.

16. An interface device for use with a video game console having a graphics processor and an electrical connector intended to receive a memory cartridge, said apparatus comprising:

electrical engagement means to removably connect said interface device to said electrical connector of said video game console; and a graphics co-processor electrically connected to said electrical engagement means to provide additional graphics processing capabilities in combination with said video game console graphics processor to execute one or more programs from a memory storage device removably connected to said combination of said video game console and said graphics co-processor, said one or more programs being nonexecutable on said video game console when said graphics co-processor is absent.

17. An interface device according to claim 16 further including a graphics memory.

18. An interface according to claim 17 wherein said graphics memory comprises a ROM memory.

19. An interface device according to claim 16 wherein said memory storage device comprises a memory cartridge.

20. An interface device for use with a video game console having a graphics processor and an electrical connector intended to receive a memory cartridge, the interface including:

an electrical engagement means to removably connect said interface device to said electrical connector of said video game console; and a graphics co-processor in said interface electrically connected to said electrical engagement means to provide additional graphics processing capabilities in combination with said video game console graphics processor to execute one or more programs from a memory storage device, said programs being nonexecutable on said video game console when said interface device is disconnected therefrom.

21. An interface device according to claim 20 wherein said memory storage device comprises a memory cartridge.

22. An interface device according to claim 20 wherein said interface further includes a graphics memory.

23. A memory cartridge to be removably received by a predetermined type video game console which has a microprocessor and a graphics processor, said cartridge comprising:

an interface including a graphics co-processor and a first casing with one end received by said predetermined type video game console; and a game cartridge including a second casing removably attached to said first casing and including at least one game program therein requiring the combination of said graphics co-processor and said predetermined type video game console microprocessor for execution.

* * * * *